United States Patent
Guel

(10) Patent No.: US 12,535,168 B2
(45) Date of Patent: Jan. 27, 2026

(54) SYSTEMS AND METHODS FOR SUPPORTING PIPE

(71) Applicant: Richard Charles Guel, Richland, WA (US)

(72) Inventor: Richard Charles Guel, Richland, WA (US)

(*) Notice: Subject to any disclaimer, the term of this patent is extended or adjusted under 35 U.S.C. 154(b) by 0 days.

(21) Appl. No.: 18/404,679

(22) Filed: Jan. 4, 2024

(65) Prior Publication Data

US 2024/0230003 A1     Jul. 11, 2024

Related U.S. Application Data

(60) Provisional application No. 63/478,646, filed on Jan. 5, 2023.

(51) Int. Cl.
    *F16L 41/00*     (2006.01)
    *F16L 13/00*     (2006.01)

(52) U.S. Cl.
    CPC ............. *F16L 41/001* (2013.01); *F16L 13/00* (2013.01)

(58) Field of Classification Search
    CPC . F16L 41/001; F16L 13/00; F16L 5/00; F16L 41/082; F16L 3/08
    USPC .................................. 248/56, 74.1, 65, 68.1
    See application file for complete search history.

(56) References Cited

U.S. PATENT DOCUMENTS

| | | | | |
|---|---|---|---|---|
| 2,404,531 A | * | 7/1946 | Robertson | F16L 3/2235 248/68.1 |
| 2,417,260 A | * | 3/1947 | Morehouse | F16L 3/227 174/157 |
| 2,419,761 A | * | 4/1947 | Bruce | F16L 3/227 248/68.1 |
| 3,021,103 A | * | 2/1962 | Beyerle | F16L 5/00 248/57 |
| 3,768,115 A | * | 10/1973 | Hoffmann | F16L 5/00 174/153 G |
| 3,920,887 A | * | 11/1975 | Kloos | H05B 3/16 174/148 |

(Continued)

FOREIGN PATENT DOCUMENTS

| | | |
|---|---|---|
| DE | 4213727 C1 | 4/1993 |
| EP | 0343395 B1 | 11/1989 |

(Continued)

OTHER PUBLICATIONS

Holdrite, Flame-rated Cold Line Tubelsolator Insert, Oct. 26, 2021.
(Continued)

*Primary Examiner* — Muhammad Ijaz
(74) *Attorney, Agent, or Firm* — Schacht Law Office, Inc.; Michael R. Schacht

(57) ABSTRACT

A pipe support clip for securing at least one pipe of a pipe system to a bracket comprising at least one bracket portion comprises a base portion having at least one retaining structure and a grip portion defining a grip passageway. The at least one retaining structure is adapted to engage the at least one bracket portion to support the grip passageway adjacent to a desired stub location. The grip passageway is sized and dimensioned to receive the pipe. The grip portion is configured to engage at least a portion of the pipe to inhibit movement of the pipe relative to the base portion.

12 Claims, 10 Drawing Sheets

(56) References Cited

U.S. PATENT DOCUMENTS

| | | | | |
|---|---|---|---|---|
| 4,202,520 A * | 5/1980 | Loos | F16L 3/222 | 248/68.1 |
| 4,550,451 A * | 11/1985 | Hubbard | E03C 1/021 | 248/68.1 |
| 4,716,925 A * | 1/1988 | Prather | D06F 37/42 | 285/12 |
| 4,907,766 A * | 3/1990 | Rinderer | F16L 3/243 | 248/57 |
| 4,909,461 A * | 3/1990 | Collins | E03C 1/021 | 248/57 |
| 5,050,824 A * | 9/1991 | Hubbard | E03C 1/021 | 248/57 |
| 5,060,892 A * | 10/1991 | Dougherty | F16L 3/221 | 248/57 |
| 5,098,047 A * | 3/1992 | Plumley | F16L 3/2235 | 248/68.1 |
| 5,205,520 A * | 4/1993 | Walker | F16L 3/2235 | 248/68.1 |
| 5,261,633 A * | 11/1993 | Mastro | F16L 3/18 | 248/68.1 |
| 5,267,464 A * | 12/1993 | Cleland | B25B 7/12 | 81/367 |
| 5,370,345 A * | 12/1994 | Condon | F16L 3/24 | 248/65 |
| 5,423,345 A * | 6/1995 | Condon | F16L 5/00 | 312/229 |
| 5,551,414 A * | 9/1996 | Quick | F16L 5/10 | 126/91 A |
| 5,615,850 A * | 4/1997 | Cloninger | F16L 3/22 | 248/68.1 |
| 5,833,179 A * | 11/1998 | VandenBerg | E03C 1/021 | 248/65 |
| 5,971,329 A * | 10/1999 | Hickey | F16L 3/227 | 248/65 |
| 6,422,520 B1 * | 7/2002 | Hand | F16L 3/02 | 248/65 |
| 6,481,764 B1 * | 11/2002 | Kwok | B21D 39/04 | 29/516 |
| 6,595,476 B1 * | 7/2003 | Edwards | F21V 21/02 | 248/200.1 |
| 6,796,335 B1 * | 9/2004 | Hubbard | F16L 57/005 | 248/57 |
| 7,014,152 B2 * | 3/2006 | Grendahl | H02G 3/32 | 248/68.1 |
| 7,039,965 B1 * | 5/2006 | Ismert | E03C 1/021 | 248/68.1 |
| D538,634 S * | 3/2007 | King | D8/380 | |
| 7,191,794 B2 * | 3/2007 | Hodges | E03C 1/042 | 248/65 |
| 7,299,935 B2 * | 11/2007 | Skaley | F16L 3/223 | 248/68.1 |
| 7,527,225 B1 * | 5/2009 | Schulz | F16L 3/1226 | 248/65 |
| 7,784,745 B2 * | 8/2010 | Dodge | F16L 3/1075 | 138/158 |
| 7,823,846 B2 * | 11/2010 | Williams, III | F16L 5/00 | 52/696 |
| 8,348,204 B2 * | 1/2013 | Kataoka | B61D 49/00 | 248/68.1 |
| 8,622,092 B1 * | 1/2014 | Condon | E03C 1/021 | 248/214 |
| 9,725,892 B2 * | 8/2017 | Ismert | F16L 5/14 | |
| 9,784,385 B1 * | 10/2017 | Striebel | F16L 3/13 | |
| 9,834,914 B2 * | 12/2017 | Ben Jacov | F16L 5/10 | |
| 9,982,803 B2 * | 5/2018 | Kipp | E03C 1/021 | |
| 10,612,696 B2 * | 4/2020 | Milner | F16B 2/12 | |
| 10,644,486 B2 * | 5/2020 | Gintz | H02G 3/0437 | |
| 11,047,510 B2 * | 6/2021 | Juzak | B05B 15/62 | |
| 11,512,800 B2 * | 11/2022 | Farley | B23P 19/02 | |
| 2003/0005517 A1 * | 1/2003 | Randolph | E03C 1/021 | 4/695 |
| 2004/0084591 A1 * | 5/2004 | Iinuma | H04R 1/025 | 248/309.1 |
| 2005/0006535 A1 * | 1/2005 | Brown | H02G 3/32 | 248/70 |
| 2007/0221792 A1 * | 9/2007 | Kauppila | F16J 15/3268 | 248/56 |
| 2007/0227527 A1 * | 10/2007 | Kopp | F23J 13/00 | 126/314 |
| 2008/0022748 A1 * | 1/2008 | Feliciano | B21D 39/046 | 72/409.19 |
| 2008/0265571 A1 * | 10/2008 | Gallardo | F16L 5/08 | 285/223 |
| 2009/0218451 A1 * | 9/2009 | Lundborg | F16L 5/02 | 248/65 |
| 2011/0204624 A1 * | 8/2011 | Lawrence | F16L 13/142 | 285/345 |
| 2011/0253846 A1 * | 10/2011 | Kataoka | B61D 49/00 | 248/68.1 |
| 2011/0253847 A1 * | 10/2011 | Kataoka | H02G 3/088 | 248/68.1 |
| 2014/0263867 A1 * | 9/2014 | Brown | F16L 3/08 | 248/65 |
| 2019/0249648 A1 * | 8/2019 | Van Hinsbergh | F16J 15/52 | |
| 2021/0381634 A1 * | 12/2021 | Higginbotham | F16L 55/00 | |
| 2022/0049909 A1 * | 2/2022 | Hicks, II | F28D 7/06 | |
| 2022/0057026 A1 * | 2/2022 | Farley | F16L 19/0286 | |
| 2022/0120364 A1 * | 4/2022 | Jianhua | F16L 21/06 | |
| 2022/0128184 A1 * | 4/2022 | Hess | F16L 55/1608 | |
| 2022/0146161 A1 * | 5/2022 | Hamadate | B23K 1/19 | |
| 2023/0287998 A1 * | 9/2023 | Higginbotham | F16L 13/142 | |
| 2024/0068611 A1 * | 2/2024 | Jianhua | F16L 37/091 | |
| 2024/0230003 A1 * | 7/2024 | Guel | F16L 5/00 | |

FOREIGN PATENT DOCUMENTS

| | | |
|---|---|---|
| EP | 3633112 A1 | 4/2020 |
| WO | WO2024148270 A1 | 7/2024 |

OTHER PUBLICATIONS

International Searching Authority, International Search Report & Written Opinion, Apr. 17, 2024, 8 pages.
Oatey, Pipe Support Bracket with ½ in. Insulator Pipe Clamps, Nov. 19, 2020.
Pexrite 20 in. Flat Galvanized Bracket with 1-⅜ in. Keyed Holes (50-Pack), https://www.ebarnett.com/Sku/461050/pexrite-20-in-flat-galvanized-bracket-with-1-38-in-keyed-holes-50-pack-671119103182-103-18. 6 pages.
Holdrite, Variable Closure Isolation Clamp, 2021, 3 pages.

* cited by examiner

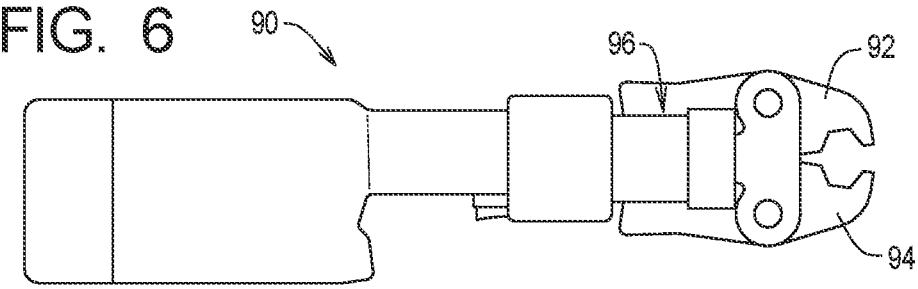
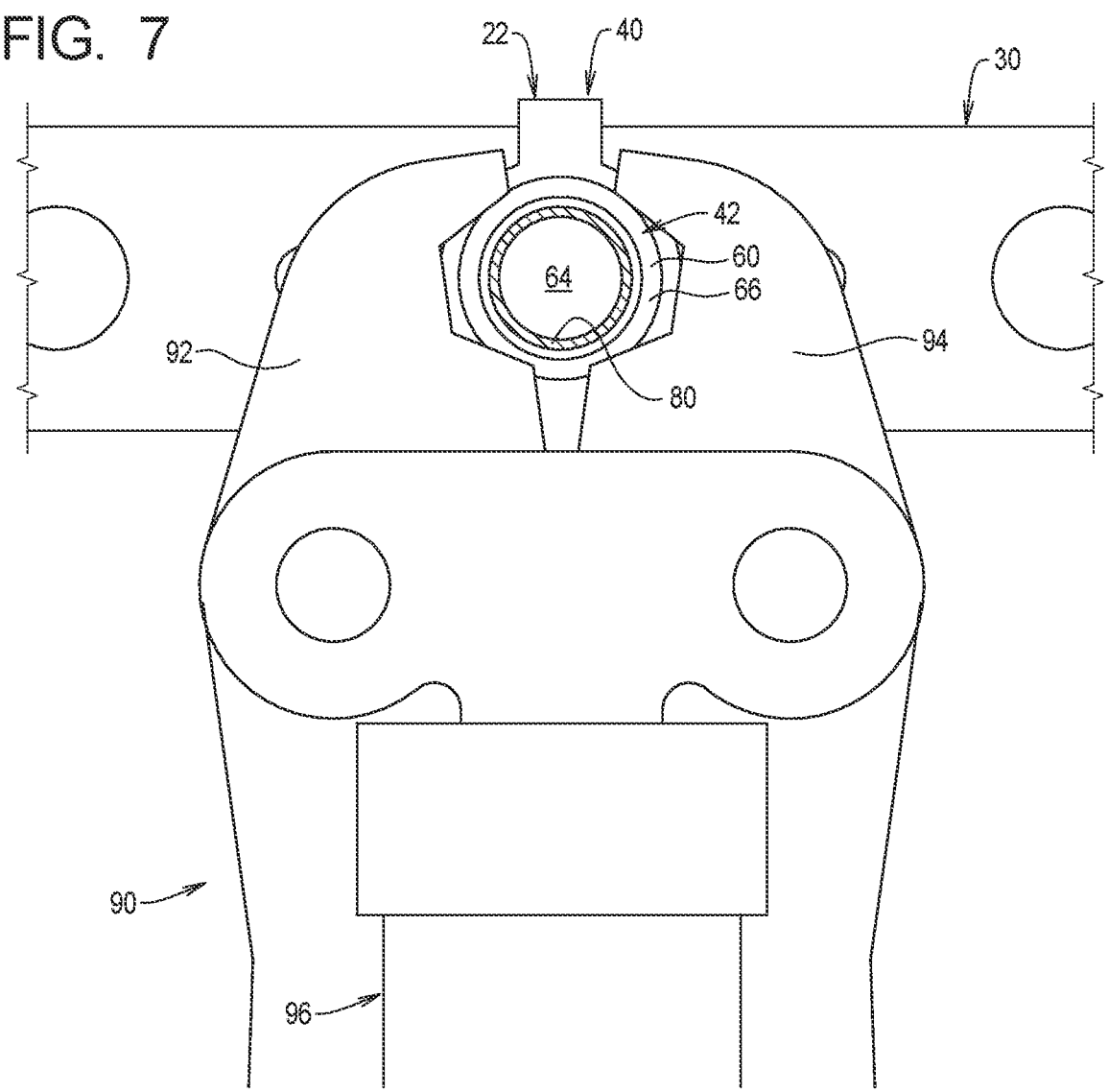

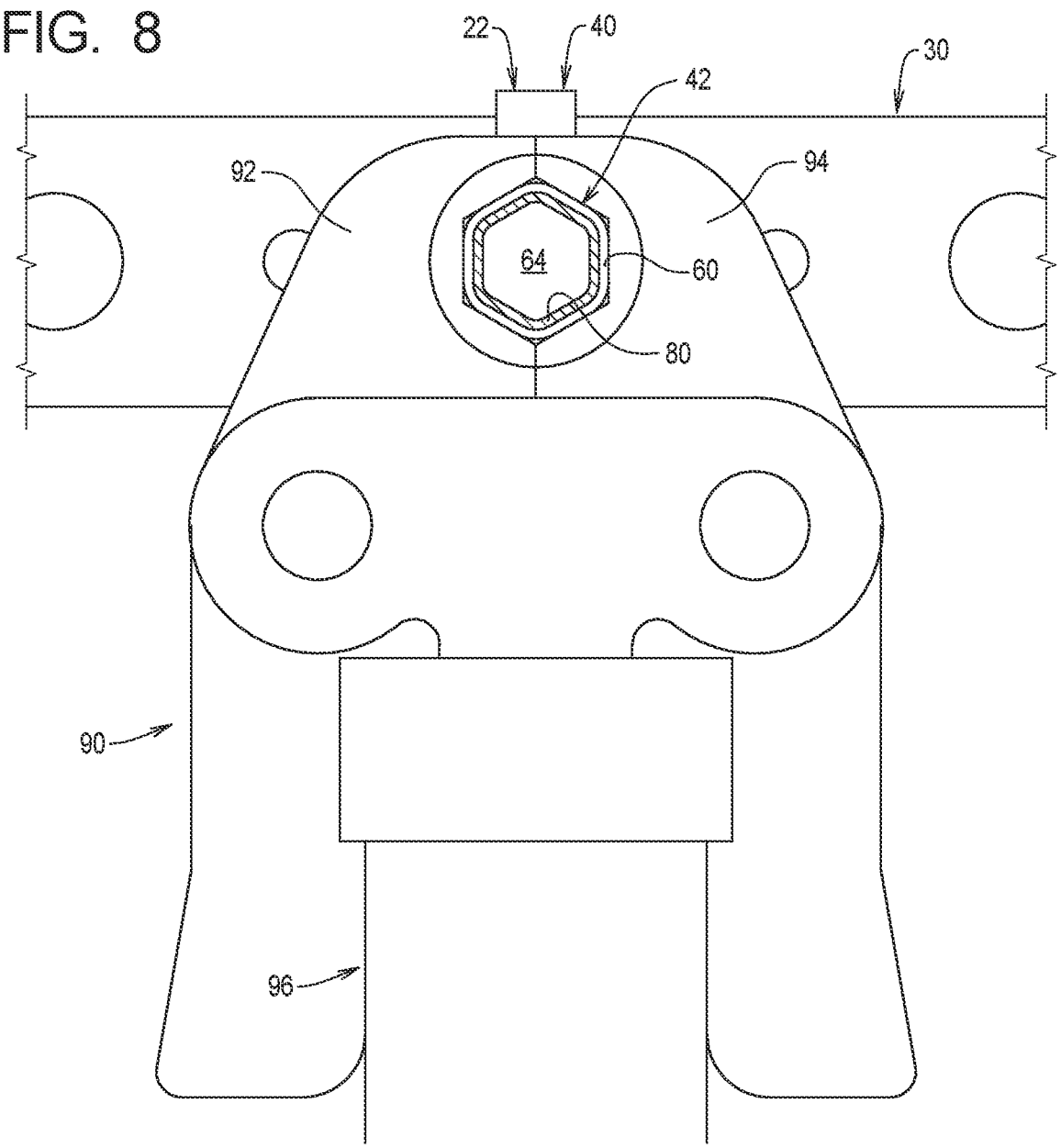

SYSTEMS AND METHODS FOR SUPPORTING PIPE

RELATED APPLICATIONS

This application, U.S. patent application Ser. No. 18/404,679 filed Jan. 4, 2024, claims benefit of U.S. Provisional Application Ser. No. 63/478,646 filed Jan. 5, 2023, now expired, the contents of which are incorporated herein by reference.

TECHNICAL FIELD

The present invention relates to systems and methods for supporting pipe relative to a structure and, more particularly, to systems and methods for securing plumbing pipe relative to a structural member.

BACKGROUND OF THE INVENTION

Pipe systems are used to carry water from a source of pressurized water to a fixture or from a fixture to a destination of waste water. Typically, the fixture is a fixture such as a sink, toilet, washing machine, dishwasher, or the like. Pipe refers to any structure capable of conveying water from the source to the destination and can take many forms, including copper pipe, PVC pipe, PEX tubing, and flexible pipe and associated fittings. The term "waste water" will be used to refer to any water leaving a fixture through a drain or the like, and the destination of waste water may be a sewer, water treatment facility, or the like. In this context, the source may be the supply of pressurized water to the fixture (e.g., utility water connection), in which case the fixture is the destination of water. Alternatively, in the case of waste water from a fixture, the source may be the fixture and the destination is the suitable waste water destination (e.g., sewer or water treatment system).

The process of installing pipe systems is typically divided into rough plumbing and finish plumbing stages. When pipe is arranged to extend from a pressurized water source to a fixture, pipe is run from the source to a stub location at which the fixture is to be installed during the rough plumbing stage. When pipe is arranged to extend from a fixture to a sewer or water treatment system, the pipe is run from a stub location at which the fixture is to be installed during the rough plumbing stage to the waste water destination. The pipe run typically extends through portions of a building structure such as floor systems, wall systems, and/or in the ground (e.g., under a concrete floor slab). At the stub location, a short piece of pipe, often referred to as a stub, is extended out of the building structure into the occupied space. As an example, during rough plumbing one or more pipe stubs may be supported to extend out of a wall cavity immediately below a location where a sink is to be mounted.

After rough plumbing is complete, the building structure may completed (e.g., drywall installed and finishes and trim applied) to a point where fixtures may be mounted. In the example of a sink, drywall may be applied to wall studs around the pipe stub and mudded, taped, primed, and painted in preparation for installation of the sink.

When the building structure is sufficiently completed to allow the finish plumbing stage to begin, the sink is secured to the finished wall, and the pipe run is completed by installing pipe between the pipe stub and fixture. In the sink example, a flexible hose may be connected from the pipe stub and an input of a faucet mounted in the sink.

Pipe systems are typically not rigid, and flexing of the pipe system supporting the pipe stub can allow movement of the pipe stub. Accordingly, after completion of the rough plumbing stage and before and during the finish plumbing stage, it is desirable, if perhaps not essential, that the pipe stub be secured relative to the building structure. To secure the pipe stub relative to the building structure, a bracket member may be secured to one or more structural members defined by the building structure, and the pipe stub is secured to the bracket member. As one common example, a copper stub bracket in the form of an elongate strip defining support openings and fastener openings is secured to two wall studs such that one of the support openings is at a desired stub location adjacent to the space where the fixture will be mounted. In this example, a copper pipe stub is passed through support opening at the desired stub location and tacked in place by soldering the copper pipe to the copper stub bracket. An alternative to a stub bracket includes securing wood blocking or the like behind the pipe stub and securing a portion of the pipe system to the wood blocking with a pipe strap.

A problem with soldering a copper pipe to a copper pipe bracket is that, during certain rough plumbing jobs, the use of a torch requires time consuming and expensive fire protection measures to be taken. A problem with the use of wood blocking is that the plumber must stop the rough plumbing process to fetch wood and carpentry tools before completing the rough-in of the pipe stub. The use of wood blocking is thus also time consuming and expensive.

The need thus exists for systems and methods for facilitating the securing of a pipe stub at a desired stub location during rough plumbing.

SUMMARY

The present invention may be embodied as a pipe support clip for securing at least one pipe of a pipe system to a bracket comprising at least one bracket portion. In this example embodiment, the pipe support clip comprises a base portion having at least one retaining structure and a grip portion defining a grip passageway. The at least one retaining structure is adapted to engage the at least one bracket portion to support the grip passageway adjacent to a desired stub location. The grip passageway is sized and dimensioned to receive the pipe. The grip portion is configured to engage at least a portion of the pipe to inhibit movement of the pipe relative to the base portion.

The present invention may also be embodied as a method of securing at least one pipe of a pipe system to a bracket comprising at least one bracket portion. In this example embodiment, the method comprises the following steps. A pipe support clip is provided. The pipe support clip comprises a base portion having at least one retaining structure and a grip portion defining a grip passageway sized and dimensioned to receive the pipe. The at least one retaining structure is engaged with the at least one bracket portion to support the grip passageway adjacent to a desired stub location. The at least one pipe is arranged within the grip passageway such that the grip portion engages at least a portion of the pipe to inhibit movement of the pipe relative to the base portion.

BRIEF DESCRIPTION OF THE DRAWINGS

FIG. 6 is a side elevation view of an example grip fitting tool that may be used to form the first example pipe support system;

FIGS. 7 and 8 are front elevation views illustrating use of the example grip fitting tool to form the first example pipe support system;

DETAILED DESCRIPTION

Figure 1:
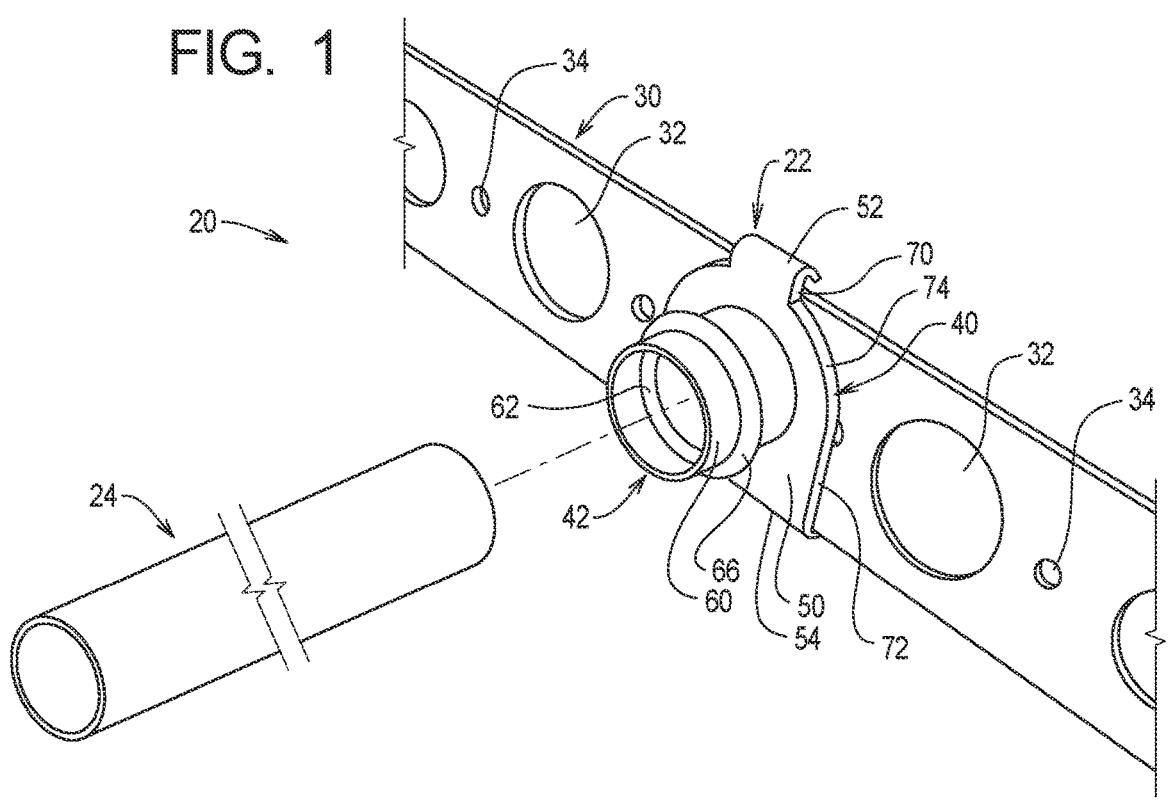
FIG. 1 is a perspective view depicting assembly of a first example pipe support system of the present invention.
Figure 2:
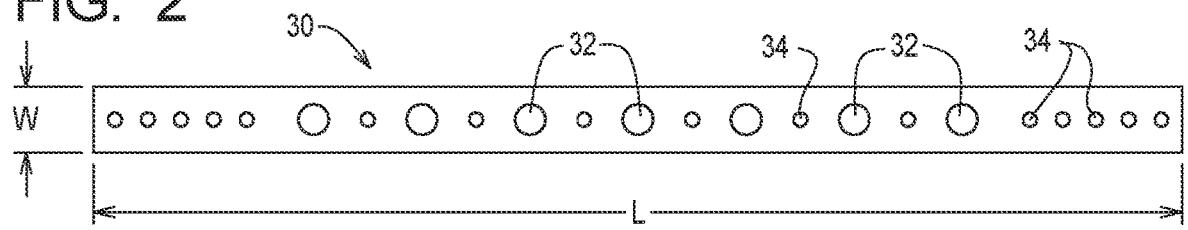
FIG. 2 is a front elevation view illustrating a bracket member forming a part of the first example pipe support system.
Figure 3:
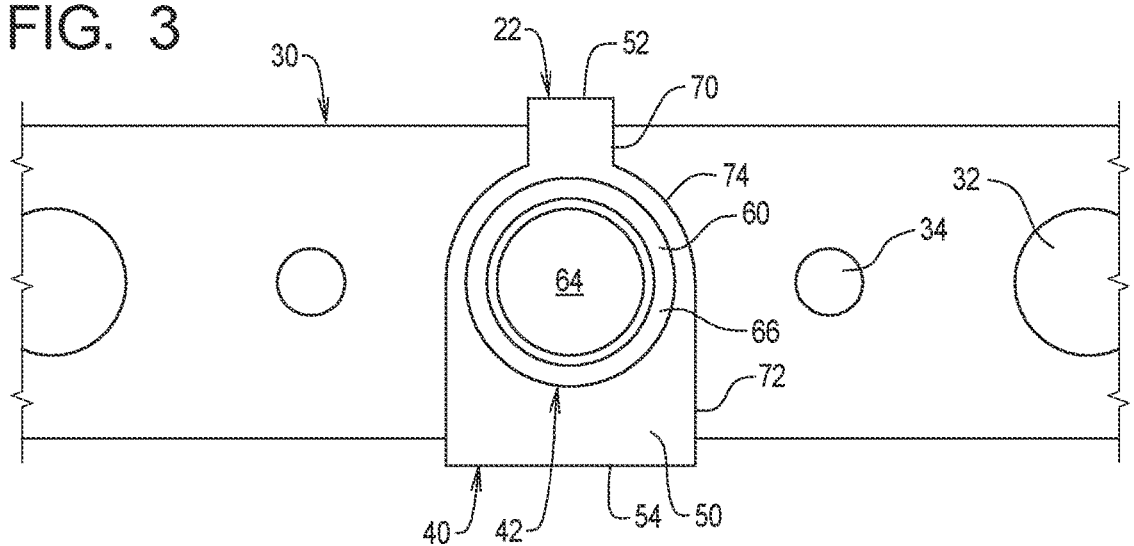
FIG. 3 is a front elevation view illustrating the first example pipe support system and a first example pipe support clip of the first example pipe support system.

Referring initially to FIGS. 1-5 of the drawing, depicted therein is a first example pipe support system 20 comprising a first example pipe support clip 22 constructed in accordance with, and embodying, the principles of the present invention. As perhaps best shown in FIGS. 4 and 5, the first example pipe support system 20 is configured to support at least a portion of a first example pipe system 24 relative to at least one structural member 26.

The first example pipe support system 20 comprises, in addition to the first example pipe support clip 22, a bracket member 30. As perhaps best shown in FIG. 2, the example bracket member 30 defines support openings 32, fastener openings 34, a width dimension W, and a length L. The example pipe system 24, the example structural member 26, and the example bracket member 30 are or may be conventional and will not be described herein beyond that extent helpful to a complete understanding of the construction and operation of the first example pipe system 20.

The first example pipe support clip 22 comprises a first example base portion 40 and a first example grip portion 42. The first example base portion 40 comprises a first example base plate 50, a first example upper retaining structure 52, a first example lower retaining structure 54, and a base plate opening 56. In use, the example bracket member 30 is secured to the structural member 26. The first example pipe support clip 22 is arranged such that at least one of the upper and lower retaining structures 52 and 54 engage the example bracket member 30 substantially to fix a location of the first example support clip relative to the structural member 26. A portion of the example pipe system 24 is then inserted at least partly through the base plate opening 56 and into at least a portion of the first example grip portion 42. The example pipe grip portion 42 is then deformed such that such that the grip portion 42 engages the portion of the example pipe system 24 within the grip portion 42 to fix a location of the first example pipe system 24 relative to the example pipe support clip 22.

The construction, operation, and use of the first example pipe support system 20 will now be described in further detail.

Initially, in the first example pipe support clip 22 described herein, the example base portion 40 and the example grip portion 42 are integrally formed from the same material. The material from which the first example pipe support clip 22 is formed is typically inelastically deformable to allow the grip portion 42 to be deformed such that the portion of the pipe system 24 within the grip portion 42 is secured relative to the example pipe support clip 22 as generally described above.

Further, the example base plate 50 defines an upper edge 70, a lower edge 72, and a shoulder edge 74. As perhaps best illustrated in FIG. 3, the example upper edge 70 is smaller in a lateral direction than the lower edge 72. The example shoulder edge 64 transitions between the example lower edge 72 and the example upper edge 70 such that example base plate opening 56 is completely circumscribed by the first example base plate 50. However, the base plate 50 may be configured to extend only partly around the base plate opening 56 if the structural purposes of the example support clip 22 can be obtained.

Figure 4:
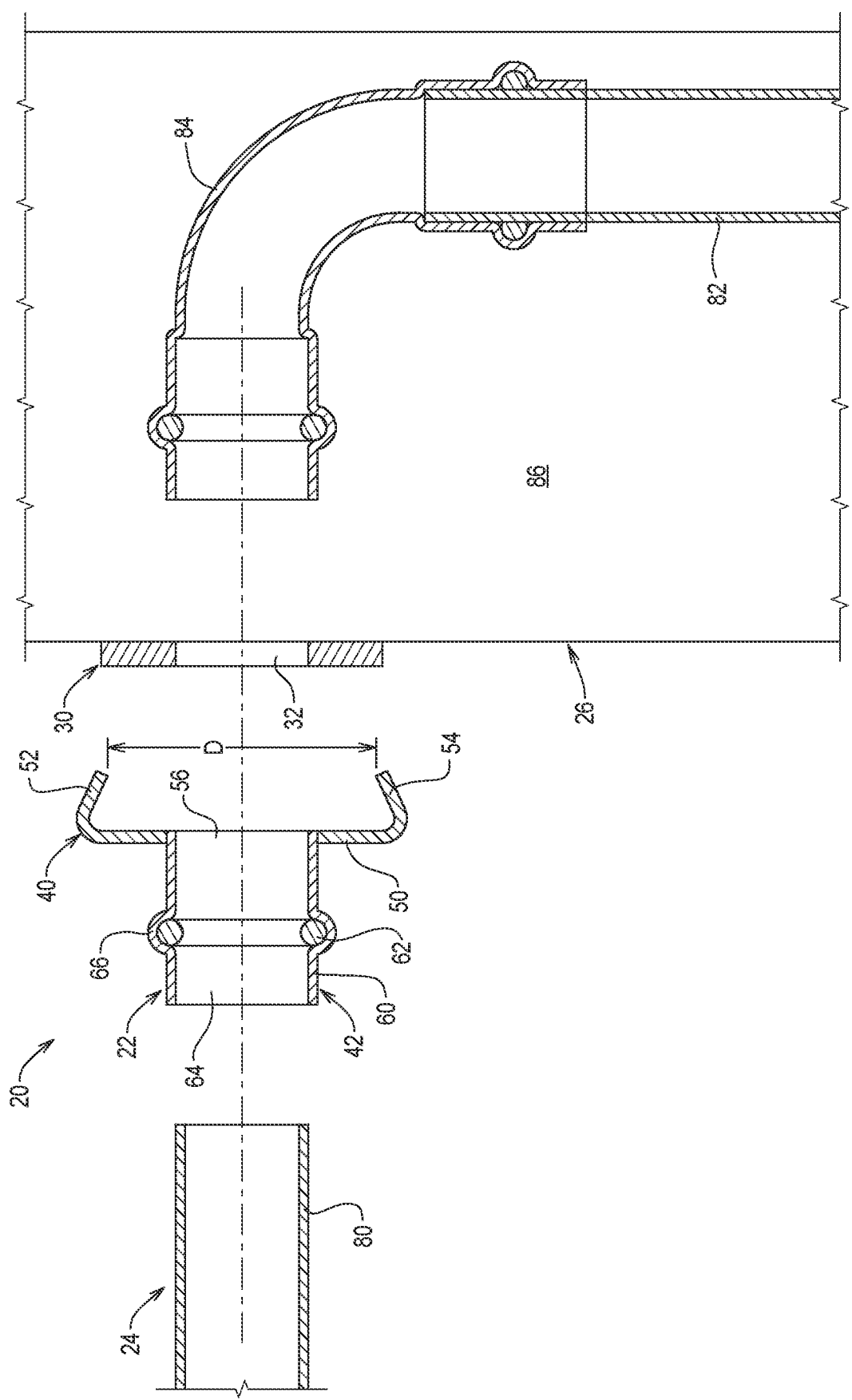
FIG. 4 is a side elevation, section, exploded view depicting components of the first example pipe support system.

And as perhaps best shown in FIGS. 1, 4, and 6, the example upper retaining structure 52 and the example lower retaining structure 54 extend toward each other away from the example grip portion 42. Distal portions of the upper and lower retaining structures 52 and 54 define a tab spacing distance D as shown in FIG. 4. For reasons to be described below, the example tab spacing distance D is predetermined to be approximately the same as, slightly smaller than, or slightly greater than the width W of the bracket member 30.

An example of a structure that may be used as the example grip portion 42 is a grip fitting commonly used in commercial plumbing to seal pipe to a pipe fitting. A conventional grip fitting is typically made of copper, and conventional plumbing tools are used to deform the grip fitting to form a seal between a pipe and a pipe fitting.

The example grip portion 42 comprises a grip body 60 made of copper and a grip member 62 made of a resiliently deformably material capable of securing a portion of the example system 24 to the example pipe support clip 22. In particular, the example grip body 60 defines a grip passageway 64 and a groove portion 66. The grip member 62 is sized and dimensioned to be supported within the grip passageway 64 by the groove portion 66 of the grip body 60.

In the example pipe support clip 22, the example upper and lower retaining structures 52 and 54 take the form of tabs or flanges. Given that the example lower edge 72 is longer than the example upper edge 70, the tab or flange forming the lower retaining structure 54 is longer than the tab or flange forming the upper retaining structure 52. In the first example pipe support clip 22, portions of the first example base plate 50 defining the upper edge 70 and the lower edge 72 are bent over or otherwise deformed to define the upper and lower retaining structures 52 and 54. Alternatively, the example upper and lower retaining structures 52 and 54 maycomprise one or more structures attached to the example base plate 50. For example, one or more plastic structures may be detachably attached to the example base plate 50 to define the first and second retaining structures 52 and 54.

The example pipe support clip 22 comprises a copper body configured to define the example base portion 40 and the example grip body 60. In this example, the grip member 62 is a separate structure arranged to be supported by the groove portion 66 of the grip body. Alternatively, the example pipe support clip 22 may be made of an inelastically deformable metal, plastic, or other material compatible with the material from which the example pipe system 24 is formed. And as will be described in further detail below, it may be possible to omit the grip member 62. In this case, the material forming the grip body 60 engages the portion of the pipe system 24 therewithin through friction, mechanical interference, adhesive, or any combination of the above.

In any case, the example pipe support clip 22 inhibits or prevents up, down, lateral, forward, and back movement of the pipe system 24 relative to the pipe support clip 22. And because the example pipe support clip 22 is secured to the bracket member 30 and the bracket member 30 is in turn secured to at least one structural member 26, up, down, lateral, forward, and back movement of the pipe system 24 relative to the structural member 26 is also substantially inhibited or prevented.

The use of the first example pipe support clip 22 to form the first example pipe support system 20 will now be described in further detail with reference to FIGS. 4-8. Initially, the example structural member 26 is or may be a stud forming part of a building structure, and the first example pipe system 24 is or may be rough-in plumbing for a plumbing fixture (not shown) such as a sink, toilet, or the like. As shown in FIG. 4, the example bracket member 30 is secured to between two studs 26 at a desired stub location adjacent to a point in space convenient for supplying water to the plumbing fixture. FIG. 4 further illustrates that the first example pipe system 24 comprises a first pipe member 80, a second pipe member 82, and pipe fitting 84. The second pipe member 82 supports the pipe fitting 84 within a wall cavity 86 defined by the studs 26 near the desired supply elevation.

Next, the first example pipe support clip 22 is arranged to be supported by the example bracket member 30 such that the example base plate opening 56 and example grip passageway 64 are substantially aligned with a desired one of the support openings 32 in the bracket member 30. Next, slight force is used to force the upper and lower retaining structures 52 and 54 from a front side to a rear side of the bracket member 30 (e.g., within the example wall cavity 86).

At this point, the upper and lower retaining structures 52 and 54 extend at least partly behind the bracket member 30 to inhibit up and down movement of the first example pipe support clip 22 relative to the bracket member 30. Optionally, but not necessarily, the upper and lower retaining structures 52 and 54 may be crimped against the back side of the bracket member 30 substantially to prevent up and down movement of the first example pipe support clip 22 relative to the bracket member 30.

Figure 5:
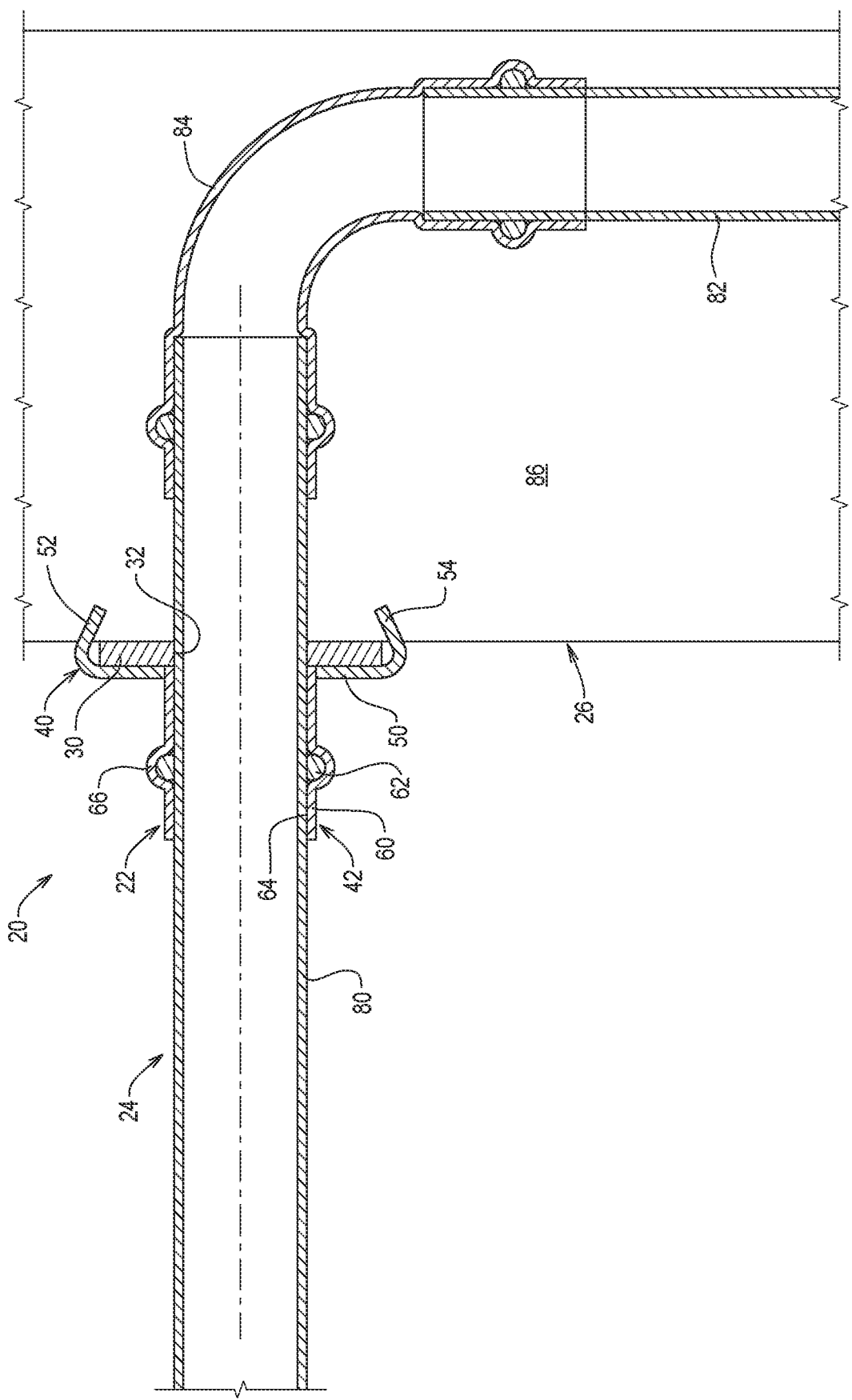
FIG. 5 is a side elevation, section view depicting the first example pipe support system.

As shown in FIG. 5, the first pipe 80 is next inserted through the grip passageway 64 and the base plate opening 56 and engaged with the pipe fitting 84. At this point, the example grip member 62 is adjacent to, and possibly engages, an outer surface of the first pipe member 80. When using the first example pipe support clip 22, a conventional crimping tool 90 defining a first jaw member 92, a second jaw member 94, and actuator assembly 96 (FIG. 6) is used to crimp the groove portion 66 of the grip body 60 as shown in FIGS. 7 and 8. After the groove portion 66 has been crimped, the groove portion 66 is deformed such that the grip member 62 is held between groove portion 66 of the grip body 60 and the outer surface of the first pipe member 80. In this example pipe support clip 22, the grip member 62 is an O-ring made of resiliently deformable material, and the grip member 62 is compressed after the groove portion 66 is crimped. At this point, movement of the example first pipe member 80 relative to the first example pipe support clip 22 is at least inhibited and, during normal use of the first example pipe system 24, substantially prevented.

Figure 9:
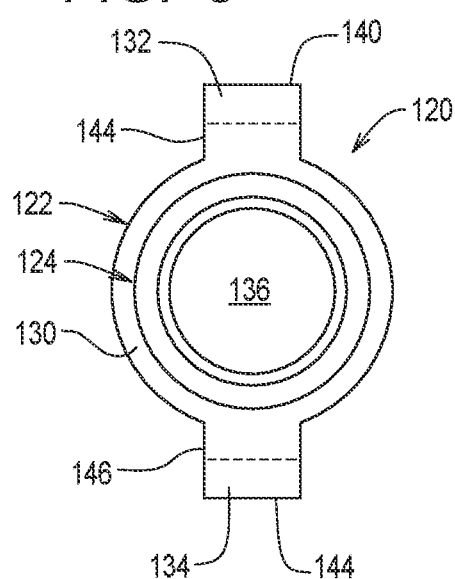
FIG. 9 is a front elevation view depicting a second example pipe support clip that may be used by an example pipe support system of the present invention.

Turning now to FIG. 9 of the drawing, a second example pipe support clip 120 constructed in accordance with, and embodying, the principles of the present invention is depicted. The second example pipe support clip 120 is used in a manner similar to the first example pipe support clip 22.

The second example pipe support clip 120 comprises a second example base portion 122 and a second example grip portion 124. The second example base portion 122 comprises a second example base plate 130, a second example upper retaining structure 132 and a second example lower retaining structure 134, and a second example base plate opening 136. The example base plate 130 further defines an upper edge 140, a lower edge 142, an upper shoulder portion 144, and a lower shoulder portion 146. Except for the upper and lower retaining structures 132 and 134, the second example base plate 130 is substantially circular such that the example base plate opening 136 is completely circumscribed by the example base plate 130. Again, the base plate 130 may be configured to extend only partly around the base plate opening 136 if the structural purposes of the example support clip 120 can be obtained.

Figure 10:
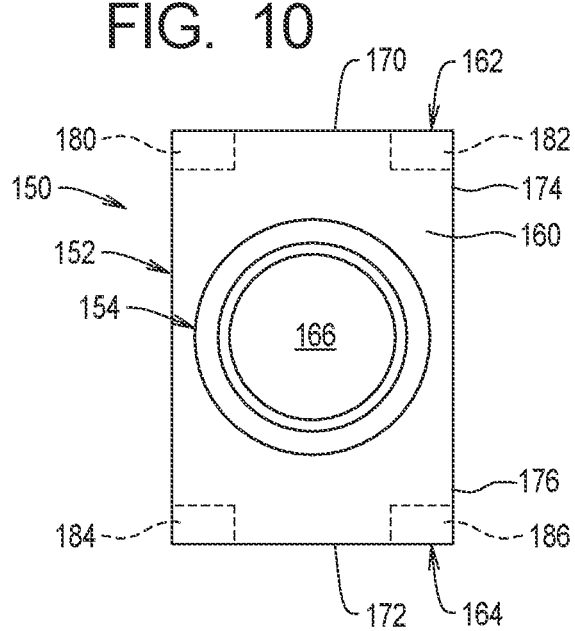
FIG. 10 is a front elevation view depicting a third example pipe support clip that may be used by an example pipe support system of the present invention.

FIG. 10 of the drawing illustrates a third example pipe support clip 150 constructed in accordance with, and embodying, the principles of the present invention is depicted. The third example pipe support clip 150 is used in a manner similar to the first example pipe support clip 22.

The third example pipe support clip 150 comprises a third example base portion 152 and a third example grip portion 154. The third example base portion 152 comprises a third example base plate 160, a third example upper retaining structure 162, and a third example lower retaining structure 164, and a third example base plate opening 166. The example base plate 160 further defines an upper edge 170, a lower edge 172, an upper shoulder portion 174, and a lower shoulder portion 176. Except for the upper and lower retaining structures 162 and 164, the third example base plate 160 is substantially rectangular and extends completely around the example base plate opening 166. Again, the base plate 160 may be configured to extend only partly around the base plate opening 166 if the structural purposes of the example support clip 150 can be obtained.

In the third example pipe support clip 150, the upper retaining structure 162 is formed by first and second upper tabs 180 and 182, and the lower retaining structure 164 is formed by first and second lower tabs 184 and 186. The first tabs 180 and 184 are spaced from the second tabs 182 and 186 such that the third example pipe support clip 150 engages the bracket member 30 at spaced locations.

Figure 11:
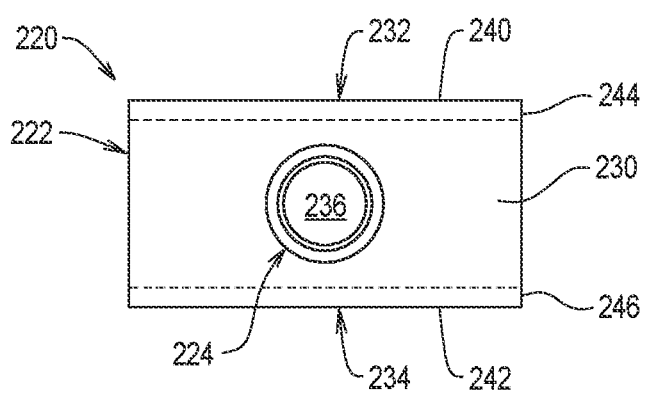
FIG. 11 is a front elevation view of depicting a fourth example pipe support clip that may be used by an example pipe support system of the present invention.

FIG. 11 of the drawing illustrates a fourth example pipe support clip 220 constructed in accordance with, and embodying, the principles of the present invention is depicted. The fourth example pipe support clip 220 is used in a manner similar to the first example pipe support clip 22.

The fourth example pipe support clip 220 comprises a fourth example base portion 222 and a fourth example grip portion 224. The fourth example base portion 222 comprise a fourth example base plate 230, a fourth example upper retaining structure 232, and a fourth example lower retaining structure 234, and a fourth example base plate opening 236. The example base plate 230 further defines an upper edge 240, a lower edge 242, an upper shoulder portion 244, and a lower shoulder portion 246. Except for the upper and lower retaining structures 232 and 234, the fourth example base plate 230 is substantially rectangular and extends completely around the example base plate opening 236. Again, the base plate 230 may be configured to extend only partly around the base plate opening 236 if the structural purposes of the example support clip 220 can be obtained. In the fourth example pipe support clip 220, the upper and lower retaining structures 230 and 232 are elongate flanges that are bent towards the back side of the base portion 222.

Figure 12:
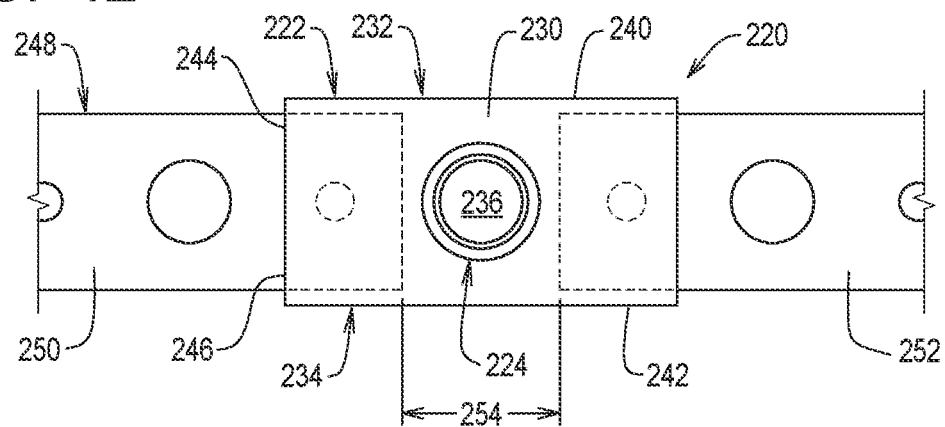
FIG. 12 is a front elevation view illustrating an example of a process for assembling the fourth example pipe support clip onto a support strap while forming an example pipe support system of the present invention.

The fourth example pipe support clip 220 is optimized for use in the repair of an existing pipe stub. As shown in FIG. 12, a failed pipe stub (not visible) has been removed from an example bracket member 248 by cutting out a portion of the bracket member 248, leaving first and second bracket portions 250 and 252 and a gap 254 between adjacent ends of the first and second bracket portions 250 and 252. The example pipe support clip 220 is secured to the first and second bracket portions across the gap 254, and a new pipe stub (not shown) may be secured at the desired stub location using the fourth example pipe support clip 220.

Figure 13:
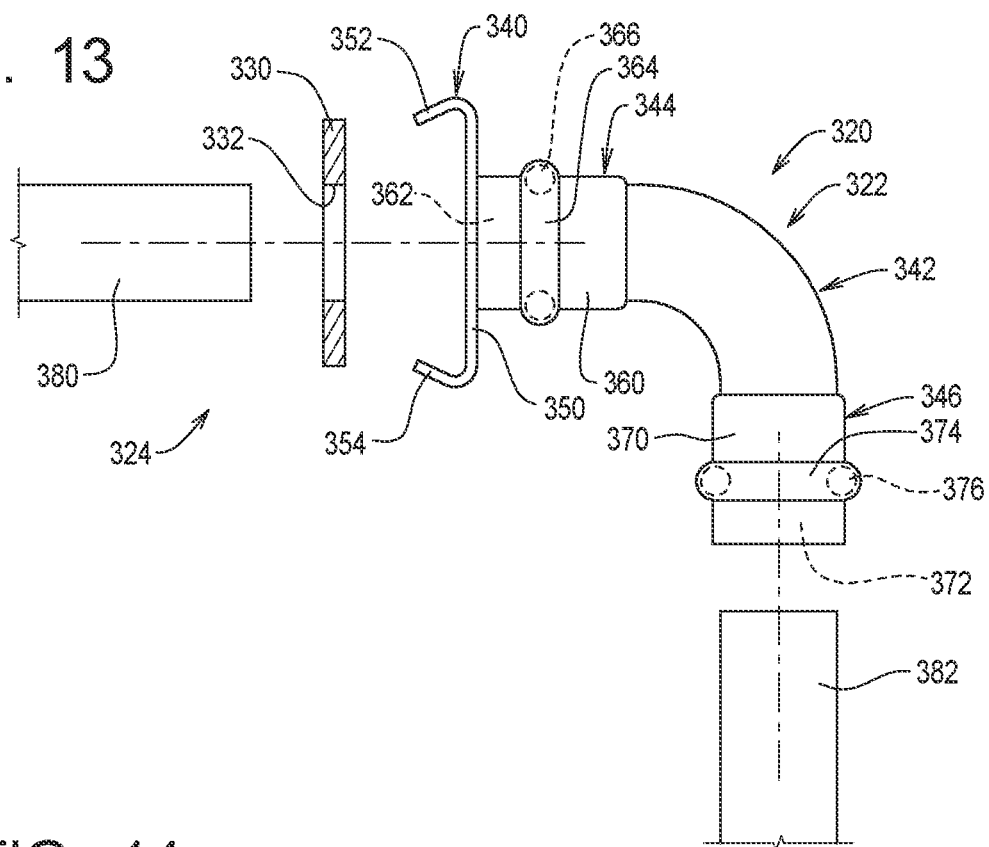
FIG. 13 is a side elevation, section, exploded view depicting components of a second example pipe support system of the present invention, including a fourth example pipe support clip of the present invention.
Figure 14:
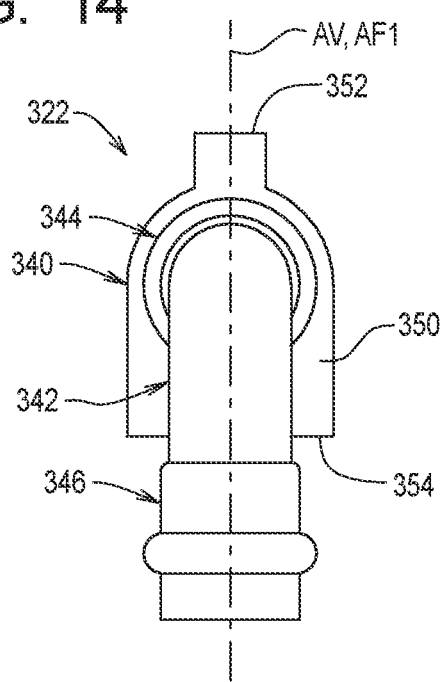
FIG. 14 is a front elevation view depicting the fifth example pipe support clip.

Turning now to FIGS. 13 and 14, depicted therein is a second example pipe support system 320 comprising a fifth example pipe support clip 322 constructed in accordance with, and embodying, the principles of the present invention. The fifth example pipe support clip 322 is configured to form at least a portion of a second example pipe system 324. The second example pipe support system further comprises, in addition to the fifth example pipe support clip 322, a bracket member 330 defining support openings 332. The fifth example pipe support clip 322 engages the bracket member and thus further supports at least a portion of the second example pipe system 324 relative to a structural member (not shown) of a building structure (not shown).

The fifth example pipe support clip 322 comprises fifth example base portion 340, a first example pipe portion 342, a first example primary grip portion 344, and a first example secondary grip portion 346.

The fifth example base plate 350 comprises a fifth example upper retaining structure 352 and a fifth example lower retaining structure 354 and defines a base plate opening (not shown). The first example primary grip portion 344 defines a first example primary grip body 360, a first example primary grip passageway 362, a first example primary groove portion 364, and a grip member 366. The first example secondary grip portion 346 defines a first example secondary grip body 370, a first example secondary grip passageway 372, a first example secondary groove portion 374, and a grip member 376.

The second example pipe system 324 comprises first and second pipe members 380 and 382. The sixth example pipe support clip 322 not only functions to support the second example pipe system 324 relative to a building structure but also functions as part of the second example pipe system 324.

As perhaps best shown in FIG. 13, the fifth example pipe support clip 322 is arranged within a wall cavity (not shown), and the upper and lower retaining structures 352 and 354 are engaged with the bracket member 330 such that the base plate opening (not shown) is aligned with one of the support openings 332 at the desired stub location. Again, the retaining structures 352 and 354 may be crimped to limit movement of the example pipe support clip 322 relative to the bracket member 330.

At that point, the first pipe member 380 is connected to the primary grip portion 344 and the second pipe member 382 is connected to the secondary grip portion 346. When installed, a fitting axis AF1 defined with reference to the secondary grip portion 346 is parallel to a vertical axis AV as shown in FIG. 14. The example pipe portion 342 extends along a 90 degree angle such that the fifth example pipe support clip 322 forms a 90 degree pipe fitting that extends down into the wall cavity from the desired stub location.

Figure 15:
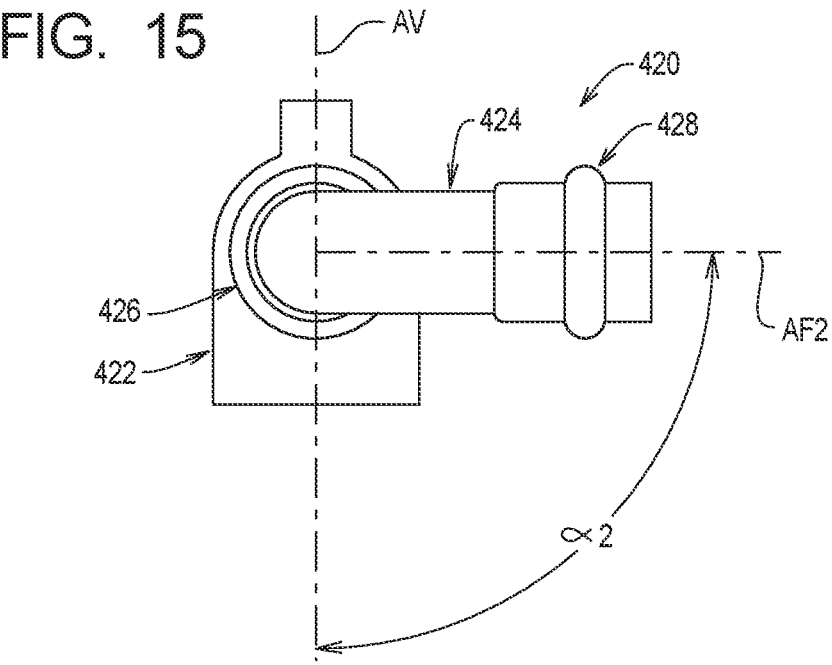
FIG. 15 is a front elevation view depicting a sixth example pipe support clip that may be used by an example pipe support system of the present invention.

FIG. 15 illustrates a sixth example pipe support clip 420 of the present invention. Like the fifth example pipe support clip 320, the sixth example pipe support clip 420 comprises a sixth example base portion 422, a second example pipe portion 424, a second example primary grip portion 426, and a second example secondary grip portion 428. When installed, the example pipe portion 424 extends along a 90 degree angle with respect to the primary grip portion 426 such that the sixth example pipe support clip 420 forms a 90 degree pipe fitting. However, a fitting axis AF2 defined with reference to the secondary grip portion 428 is perpendicular to a vertical axis AV such that the example secondary grip portion 428 is further arranged relative to the base portion 422 to extend horizontally into the wall cavity from the desired stub location.

Figure 16:
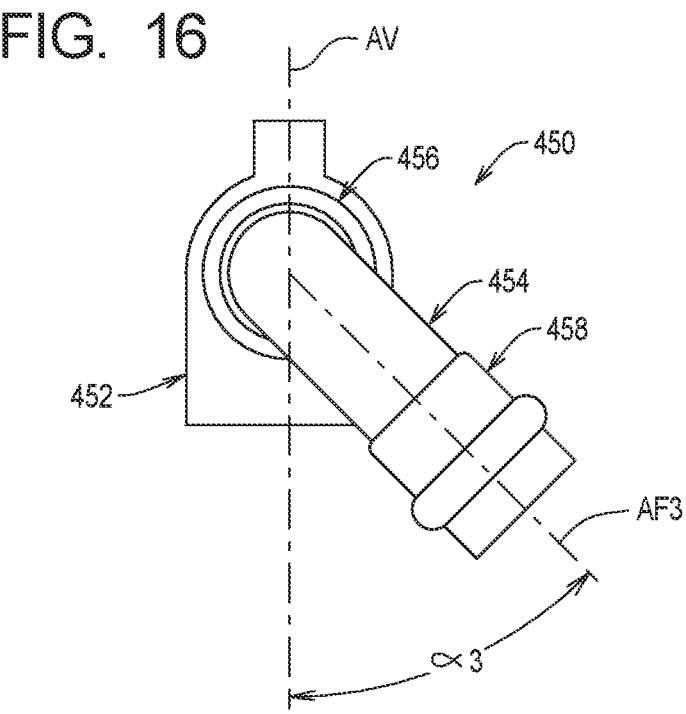
FIG. 16 is a front elevation view depicting a seventh example pipe support clip that may be used by an example pipe support system of the present invention.

FIG. 16 illustrates a seventh example pipe support clip 450 of the present invention. Like the fifth example pipe support clip 322, the seventh example pipe support clip 450 comprises a seventh example base portion 452, a third example pipe portion 454, a third example primary grip portion 458, and a third example secondary grip portion 458. When installed, the example pipe portion 454 extends along a 90 degree angle with respect to the primary grip portion 456 such that the seventh example pipe support clip 450 forms a 90 degree pipe fitting. However, a fitting axis AF3 defined with reference to the secondary grip portion 458 extends downward at an angle of approximately 45 degrees with respect to a vertical axis AV. Accordingly, the example secondary grip portion 458 is further arranged relative to the base portion 452 to extend laterally and down into the wall cavity from the desired stub location.

Figure 17:
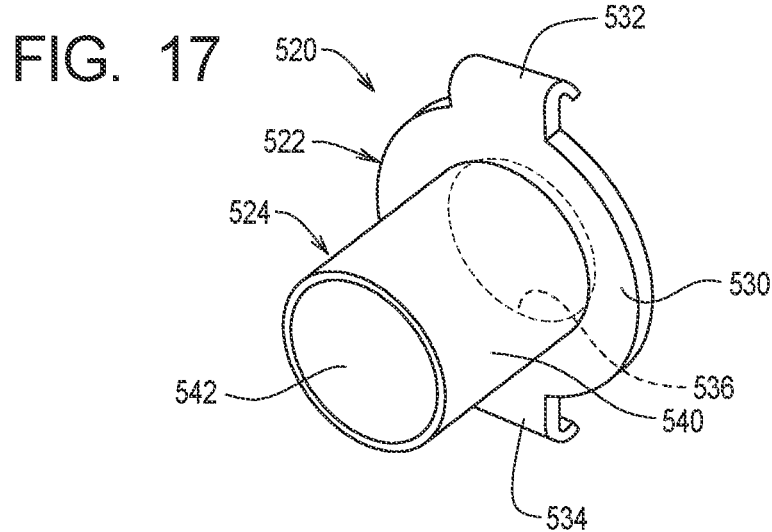
FIG. 17 is a perspective view of an eighth example pipe support clip of the present invention.

FIG. 17 illustrates an eighth example pipe support clip 520 of the present invention. The eighth example pipe support clip 520 defines an eighth example base portion 522 and an eighth example grip portion 524. The example base portion 522 comprises an eighth example base plate 530, an eighth example upper retaining structure 532, an eighth example lower retaining structure 534, and a base plate opening 536. The eighth example grip portion 524 defines a grip body 540 defining a grip passageway 542.

The eighth example pipe support clip 520 is constructed and used in a manner similar to that of the first example pipe support clip 22 described above. However, the eighth example pipe support clip 520 is integrally formed from a single piece of molded or milled plastic and does not include a grip member or a groove portion formed on the grip body 540. Instead, a first pipe member like the example first pipe member 80 described above is inserted through the grip passageway 542. A surface of the grip body 540 defining the grip passageway 542 engages the first pipe member to inhibit movement of the first pipe member along a longitudinal axis of the first pipe member relative to the pipe support clip 520. Movement of the first pipe member relative to the pipe support clip 520 may be inhibited by friction, by adhesive arranged within the grip passageway 542, by adhesive tape applied to the grip body 540 and the first pipe, and/or by mechanical engagement such as by gripping fingers formed in the grip body 540.

Figure 18:
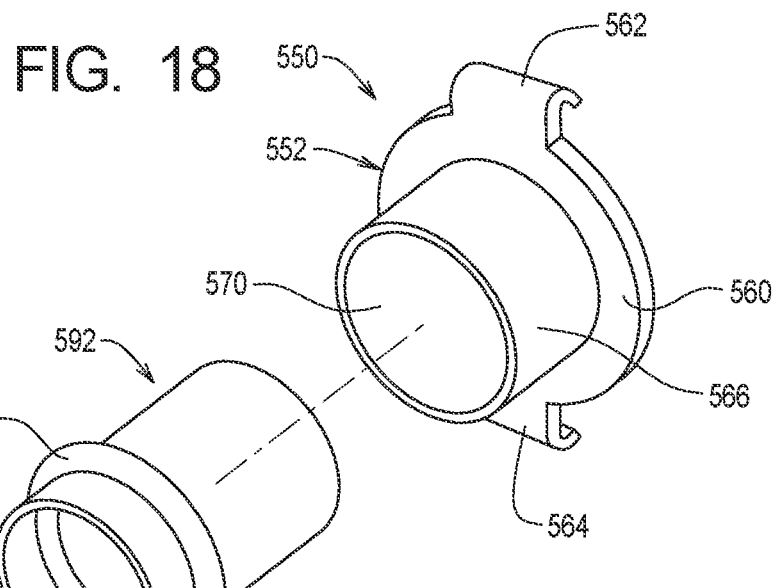
FIG. 18 is perspective exploded view of a ninth example pipe support clip of the present invention.
Figure 19:
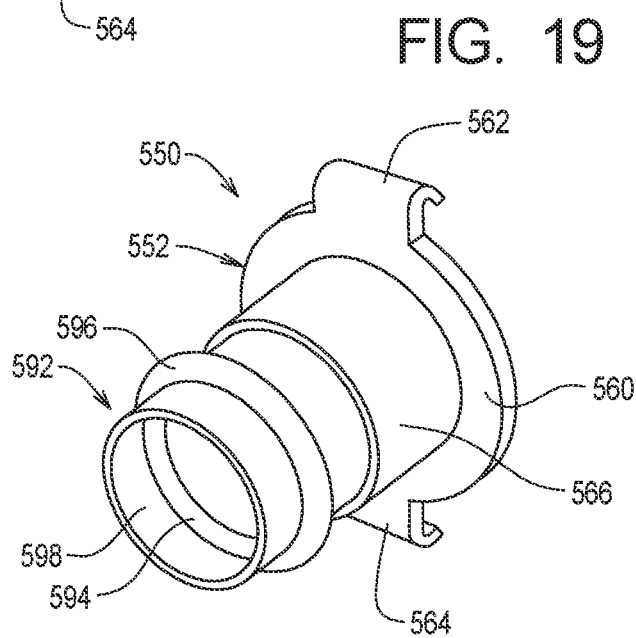
FIG. 19 is a perspective, assembled view of the ninth example pipe support clip of the present invention.

FIGS. 18 and 19 illustrate a ninth example pipe support clip 550 of the present invention. The ninth example pipe support clip 550 defines a ninth example base portion 552 and a tenth example grip portion 554. The example base portion 552 comprises a tenth example base plate 560, a ninth example upper retaining structure 562, a ninth example lower retaining structure 564, and a base plate opening 566. The ninth example grip portion 554 defines a grip body 570 defining a grip passageway 572.

The ninth example pipe support clip 550 is constructed and used in a manner similar to that of the first example pipe support clip 22 described above. However, the ninth example pipe support clip 550 comprises a base member 552 defining the example base plate 560 and retaining structures 562 and 564 and a grip assembly 566. The example base member 552 defines the example base plate 560, the example retaining structures 562 and 564, and a base socket 570.

The example grip assembly 566 comprises a grip body 592 and a grip member 594. The example grip body 592 defines a groove portion 596. The example base member 552 is made of plastic, the example grip body 592 is made of copper, and the example grip member 594 is made of resiliently deformable material.

In use, a portion of the grip body 592 is inserted into the base socket 570 (FIG. 19) such that movement between the base member 552 and the grip body 592 is substantially inhibited. Movement of the grip body 592 relative to the base member 552 may be inhibited by friction, by adhesive arranged within a grip passageway, by adhesive tape applied to the base socket 570 and the grip body, and/or by mechanical engagement such as by gripping fingers formed in the base socket 570.

With the grip body 592 secured to the base member 552, a first pipe member like the example first pipe member 80 described above is inserted through the grip passageway 598. The groove portion 596 is then crimped such that the grip member 594 is compressed to frictionally engage the first pipe member, thereby inhibiting movement of the first pipe member relative to the grip body 592.

Figure 20:
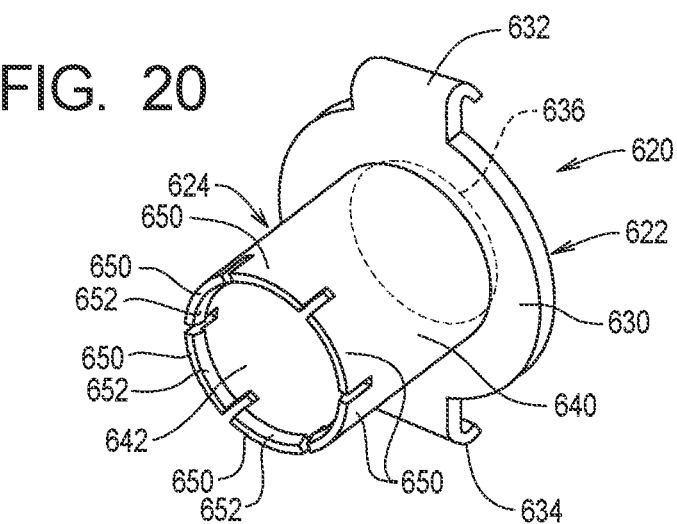
FIG. 20 is a perspective view of a tenth example pipe support clip of the present invention.
Figure 21:
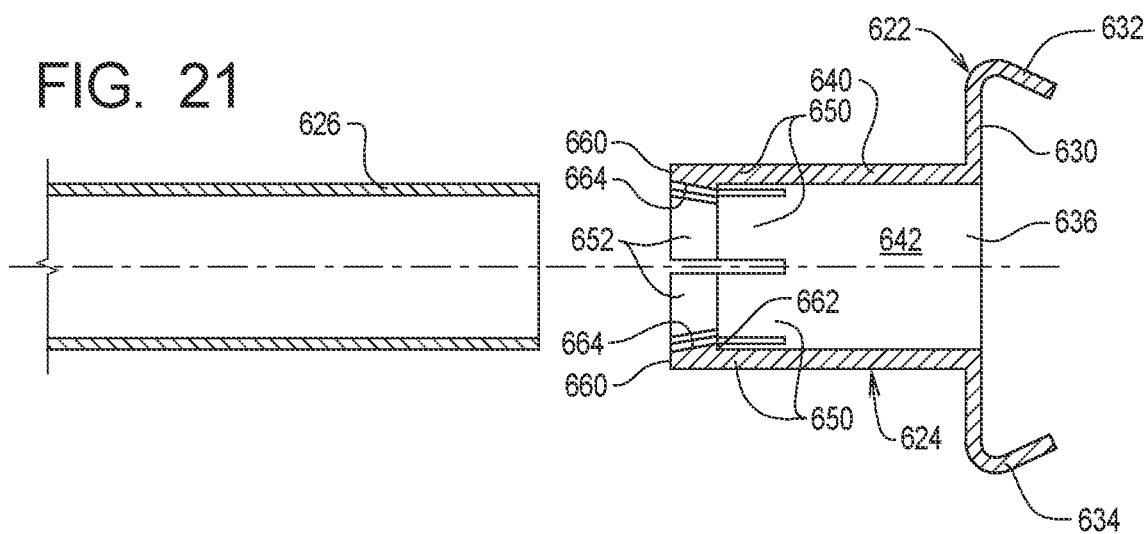
FIG. 21 is a section view of a first step of a process of using the tenth example pipe support.
Figure 22:
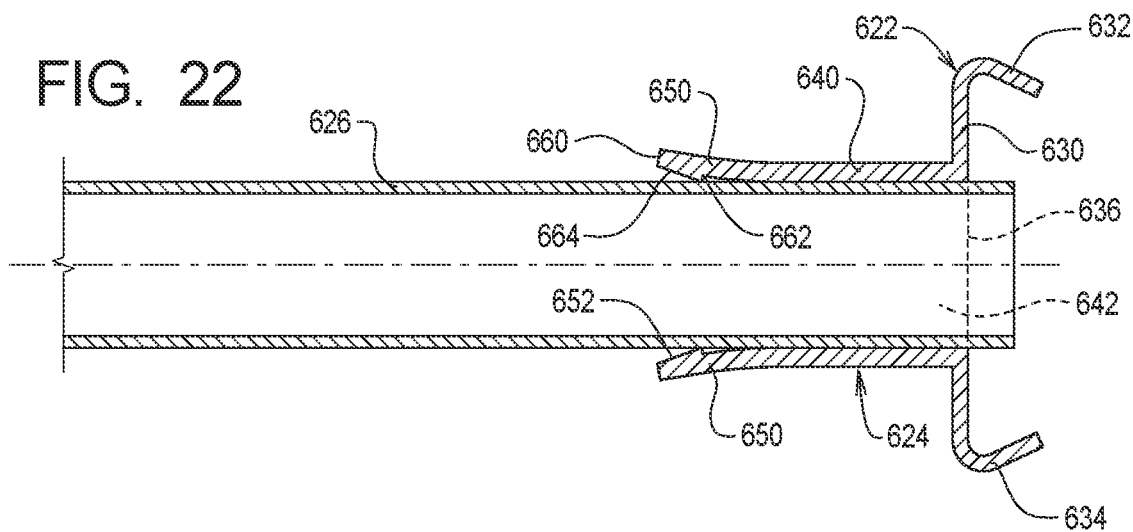
FIG. 22 is a section view of a second step of a process of using the tenth example pipe support.

FIGS. 20, 21, and 22 illustrate a tenth example pipe support clip 620 of the present invention. FIG. 20 illustrates that the tenth example pipe support clip 620 defines a tenth example base portion 622 and a tenth example grip portion 624. The tenth example pipe support clip 620 is used in a manner similar to that of the eighth example support clip 520 to support a pipe member 626 relative to a structure (not shown).

The example base portion 622 comprises a tenth example base plate 630, a tenth example upper retaining structure 632, a tenth example lower retaining structure 634, and a base plate opening 636. The tenth example grip portion 624 defines a grip body 640 defining a grip passageway 642. The example grip body 640 further defines one or more grip fingers 650. Each grip finger 650 defines a grip projection 652 that projects into the grip passageway 642. As best shown in FIG. 21, each the grip projection(s) 652 defines a finger tip 660, an annular surface 662, and a cam surface 664 extending between the finger tip(s) 660 and the annular surface(s) 662. The cam surface(s) 664 are configured such that an effective diameter of the grip passageway 642 is reduced in a direction along a longitudinal axis of the grip passageway 642 from the tip(s) 660 to the annular surface(s) 662.

In use, the example pipe member 626 is inserted into and through the grip passageway 642 as shown in FIGS. 21 and 22. FIG. 22 illustrate that the cam surface(s) 664 engage(s) the pipe member 626 such that the fingers 650 deflect outward as the pipe member 626 is extended through the grip passageway 642. The deflection of the fingers 650 increases friction between the grip body 640 and the pipe member 626 and thus inhibits relative movement between the example pipe support clip 620 and the pipe member 626.

The example tenth example pipe support clip 620 is or may be integrally formed from a single piece of resiliently deformable material such as molded or milled plastic. In addition, a portion of a surface of the grip body 640 defining the grip passageway 642 may engage the pipe member 626 to inhibit movement of the first pipe member 626 along a longitudinal axis of the first pipe member relative to the pipe support clip 620. Movement of the first pipe member relative to the pipe support clip 620 may be inhibited by friction, by adhesive arranged within the grip passageway 642, by adhesive tape applied to the grip body 640 and the first pipe, and/or by mechanical engagement such as by gripping fingers formed in the grip body 640.

What is claimed is:

1. A pipe support clip for securing at least one pipe of a pipe system to a bracket, the pipe support clip comprising:
    a base portion;
    at least first and second retaining structures integrally formed with the base portion; and
    a grip portion defining a grip passageway, where at least a portion of the grip portion is inelastically deformable; wherein
    the base portion and the at least first and second retaining structures are configured such that, with the base portion arranged on a front side of the bracket, the at least first and second retaining structures are adapted to extend at least partly along a rear side of the bracket to inhibit up, down, and lateral movement of the pipe support clip relative to the bracket and thus to support the grip passageway adjacent to a desired stub location;
    the grip passageway is sized and dimensioned to receive at least a portion of the pipe; and
    the grip portion is configured such that, with the pipe arranged within the grip passageway, inelastic deformation of the grip portion causes the grip portion to engage at least a portion of the pipe to inhibit forward and back movement of the pipe relative to the base portion.

2. The pipe support clip as recited in claim 1, in which at least a deformable portion of the grip portion is inelastically deformable, where the deformable portion is configured such that the deformable portion may be crimped to enhance engagement of the grip portion with the pipe to inhibit movement of the pipe relative to the base portion.

3. The pipe support clip as recited in claim 1, in which the grip portion is configured such that the pipe is capable of extending completely through the grip passageway.

4. The pipe support clip as recited in claim 1, in which the grip portion is configured such that the pipe is capable of extending partly through the grip passageway.

5. The pipe support clip as recited in claim 1, in which:
first retaining structure is at least one upper retaining structure;
the second retaining structure is at least one lower retaining structure; and
each of the upper and lower retaining structures is configured to engage the bracket to support the grip passageway adjacent to the desired stub location.

6. The pipe support clip as recited in claim 1, in which:
the grip portion defines a grip body and a grip member; and
the grip body supports the grip member such that the grip member is capable of engaging the pipe to inhibit movement of the pipe relative to the base portion.

7. The pipe support clip as recited in claim 6, in which the grip body defines a groove portion adapted to support the grip member within the grip passageway.

8. The pipe support clip as recited in claim 7, in which:
the grip member is resiliently deformable; and
the groove portion is inelastically deformable to compress the grip member between the grip body and the pipe.

9. The pipe support clip as recited in claim 1, in which:
the grip portion defines a grip body and first and second grip members;
the grip body supports
the first grip member such that the first grip member engages a first pipe of the pipe system to inhibit movement of the first pipe relative to the base portion, and
the second grip member such that the second grip member engages a second pipe of the pipe system to inhibit movement of the second pipe relative to the base portion.

10. The pipe support clip as recited in claim 9, in which the grip body defines first and second groove portions adapted to support the first and second grip members, respectively, within the grip passageway.

11. The pipe support clip as recited in claim 10, in which:
the first and second grip members are resiliently deformable; and
the first and second groove portions are inelastically deformable to compress the first and second grip members between the grip body and the pipe.

12. The pipe support clip as recited in claim 1, in which:
the bracket comprises first and second bracket portions, where a gap is defined between the first and second bracket portions;
to inhibit up, down, and lateral movement of the pipe support clip relative to the first and second bracket portions,
the first retaining structure is adapted to engage the first and second bracket portions, and
the second retaining structure is adapted to engage the first and second bracket portions.

* * * * *